(12) United States Patent
Peterkofsky et al.

(10) Patent No.: US 10,015,543 B1
(45) Date of Patent: Jul. 3, 2018

(54) VIDEO TRAFFIC, QUALITY OF SERVICE AND ENGAGEMENT ANALYTICS SYSTEM AND METHOD

(75) Inventors: Roy Isaac Peterkofsky, San Francisco, CA (US); Lakshman Chinnakotla, Redwood City, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 397 days.

(21) Appl. No.: 12/719,693

(22) Filed: Mar. 8, 2010

(51) Int. Cl.
*H04N 21/442* (2011.01)

(52) U.S. Cl.
CPC . *H04N 21/44213* (2013.01); *H04N 21/44222* (2013.01)

(58) Field of Classification Search
CPC ........ H04N 21/44222; H04N 21/44213; H04L 47/15; G06F 11/3466; G06F 2201/86
USPC .......................................................... 725/14
See application file for complete search history.

(56) References Cited

U.S. PATENT DOCUMENTS

| | | | | |
|---|---|---|---|---|
| 6,983,478 B1* | 1/2006 | Grauch et al. | | 725/13 |
| 7,373,376 B1* | 5/2008 | Hamer | | H04L 43/10 |
| | | | | 709/203 |
| 8,095,650 B1* | 1/2012 | Cheng | | G06F 11/32 |
| | | | | 709/203 |
| 8,151,194 B1* | 4/2012 | Chan | | G06F 17/30817 |
| | | | | 709/224 |
| 8,219,134 B2* | 7/2012 | Maharajh | | G06F 17/30035 |
| | | | | 455/3.01 |
| 8,639,796 B2* | 1/2014 | Covell | | H04L 43/0852 |
| | | | | 709/223 |
| 8,745,647 B1* | 6/2014 | Shin | | H04N 21/442 |
| | | | | 725/10 |
| 2004/0136327 A1* | 7/2004 | Sitaraman | | H04L 43/00 |
| | | | | 370/252 |
| 2006/0136578 A1* | 6/2006 | Covell | | H04L 43/0829 |
| | | | | 709/223 |
| 2008/0098446 A1* | 4/2008 | Seckin | | H04L 12/185 |
| | | | | 725/114 |
| 2008/0184245 A1 | 7/2008 | St. Jean | | |
| 2008/0215704 A1* | 9/2008 | Curcio | | H04L 29/06027 |
| | | | | 709/217 |
| 2009/0025025 A1* | 1/2009 | Vleck | | H04L 12/66 |
| | | | | 725/14 |

(Continued)

FOREIGN PATENT DOCUMENTS

EP 2106138 A2 9/2009
WO WO 2008/154003 12/2008

OTHER PUBLICATIONS

Akamai Stream Analyzer Service Description Author and Publisher: www.akamai.com Title Date: May 2009.*

(Continued)

*Primary Examiner* — Nathan Flynn
*Assistant Examiner* — Tung T Trinh
(74) *Attorney, Agent, or Firm* — Allen, Dyer, Doppelt & Gilchrist, P.A.

(57) ABSTRACT

A video traffic, quality of service and engagement analytics system and method are provided. The system and method provide business intelligence on the broad areas of traffic statistics, viewer engagement, and quality of service for online video publishers. In one implementation, the system may utilize a tracker unit for a media player to gather the information for the video analytics.

11 Claims, 9 Drawing Sheets

(56) References Cited

U.S. PATENT DOCUMENTS

| | | | |
|---|---|---|---|
| 2009/0083417 A1* | 3/2009 | Hughes | G06F 15/16 709/224 |
| 2009/0100456 A1* | 4/2009 | Hughes | 725/14 |
| 2009/0158367 A1 | 6/2009 | Myers et al. | |
| 2009/0164408 A1* | 6/2009 | Grigorik | G06F 17/30867 |
| 2010/0166051 A1* | 7/2010 | Chung | H04M 3/304 375/225 |
| 2011/0113342 A1* | 5/2011 | Gomez Ortigoza | G06F 17/30056 715/738 |
| 2011/0131596 A1* | 6/2011 | Amsterdam | H04H 60/33 725/14 |

OTHER PUBLICATIONS

Akamai Stream Analyzer Service Description Author: Akamai Date: May 2009.*

Event reference_MDN.pdf: coding reference for windows api addEventListerner, print out on Dec. 7, 2017.*

\* cited by examiner

VIDEO TRAFFIC, QUALITY OF SERVICE AND ENGAGEMENT ANALYTICS SYSTEM AND METHOD

APPENDIX

Appendix A (11 pages), which forms part of this specification, contains an example of a tracker unit code for a code implementation of the tracker unit of the system.

FIELD

The disclosure relates generally to a video viewer engagement and quality of service rating system and method.

BACKGROUND

Systems and companies that provide web analytics or web performance monitoring are numerous. The existing web analytics products are software that tracks how people view, use, or traverse through web sites. Most of these products originated for the analysis of static web pages, i.e., those consisting of text and still images rather than video or other "rich media." The original web analytics vendors, while first specializing in the analytics of static web pages, have all broadened their scopes somewhat to include some degree of video analytics. All of these vendors appear to cover only traffic statistics and viewer engagement metrics, as they did for static web pages, when they analyze online video and thus do not cover quality of service at all.

Customers seeking more extensive analytics of online video have turned to more specialized video analytics vendors. One such vendor includes only viewer engagement statistics and does not cover quality of service at all. In fact, the focus of this vendor is on tracking traffic of videos posted to user-generated-content sites like YouTube, where they track only broad traffic statistics, not even detailed viewer engagement measures. Another vendor is presently marketed almost exclusively via an OEM arrangement with Nielsen and, as such, is heavily focused on audience measurement (traffic statistics and viewer engagement) and does not appear to cover quality of service. Yet another video analytics vendor has recently introduced some quality of service coverage which we believe to be minimal.

In addition to the products above, there currently exist end-to-end online video platform providers that offer software packages intended to meet all of the needs of online video publishers: ingestion, encoding, content management, player applications, advertising integration, and analytics such as shown in FIG. 1. Among the 60-100 vendors in this space, a few have made a particular effort to produce best-of-breed analytics elements. However, these analytics modules, presently, generally do not contain any quality-of-service elements At least one video platform provider sells an analytics module "a la carte" rather than solely bundled with the overall platform.

The web performance monitoring companies allow the customers to determine how long their web pages take to load, what their availability and down time are, etc. These web performance monitoring companies typically offer "panel based" analysis which may involve "agents" or "robot" servers that live in CDN data centers or it may rely on instrumentation of the PCs of a selection of real users from around the world (just as Nielsen has long instrumented the TVs of its "panels"). In any case, these approaches do not measure the real experiences of the "full census" (100% sample) of real users. In fact, the measurements are often limited to staged, advanced-scheduled tests covering very limited stretches of time. However, it is desirable to provide an analytics system that covers every play by every user and is always on.

The leading web performance monitoring companies originally developed their services to measure the performance of static web pages. Now, however, both leading companies in this space have developed products that measure key elements of performance specifically for online video. These products generally rely on the same agent- and panel-based approaches as their original products for static web pages and share the same weaknesses.

Thus, it is desirable to provide a video analytics for traffic, quality of service and engagement system and method that overcomes the limitations of current systems and it is to this end that the disclosure is directed.

DETAILED DESCRIPTION OF ONE OR MORE EMBODIMENTS

The disclosure is particularly applicable to a web-based video analytics for traffic, quality of service and engagement system that uses a media player tracker unit and it is in this context that the disclosure will be described. It will be appreciated, however, that the system and method has greater utility since the system can be implemented differently (peer to peer, client/server, hardwired link, etc.) and those other implementations are within the scope of the disclosure. Now, an example of an implementation of the video analytics system is described in more detail.

Figure 1:
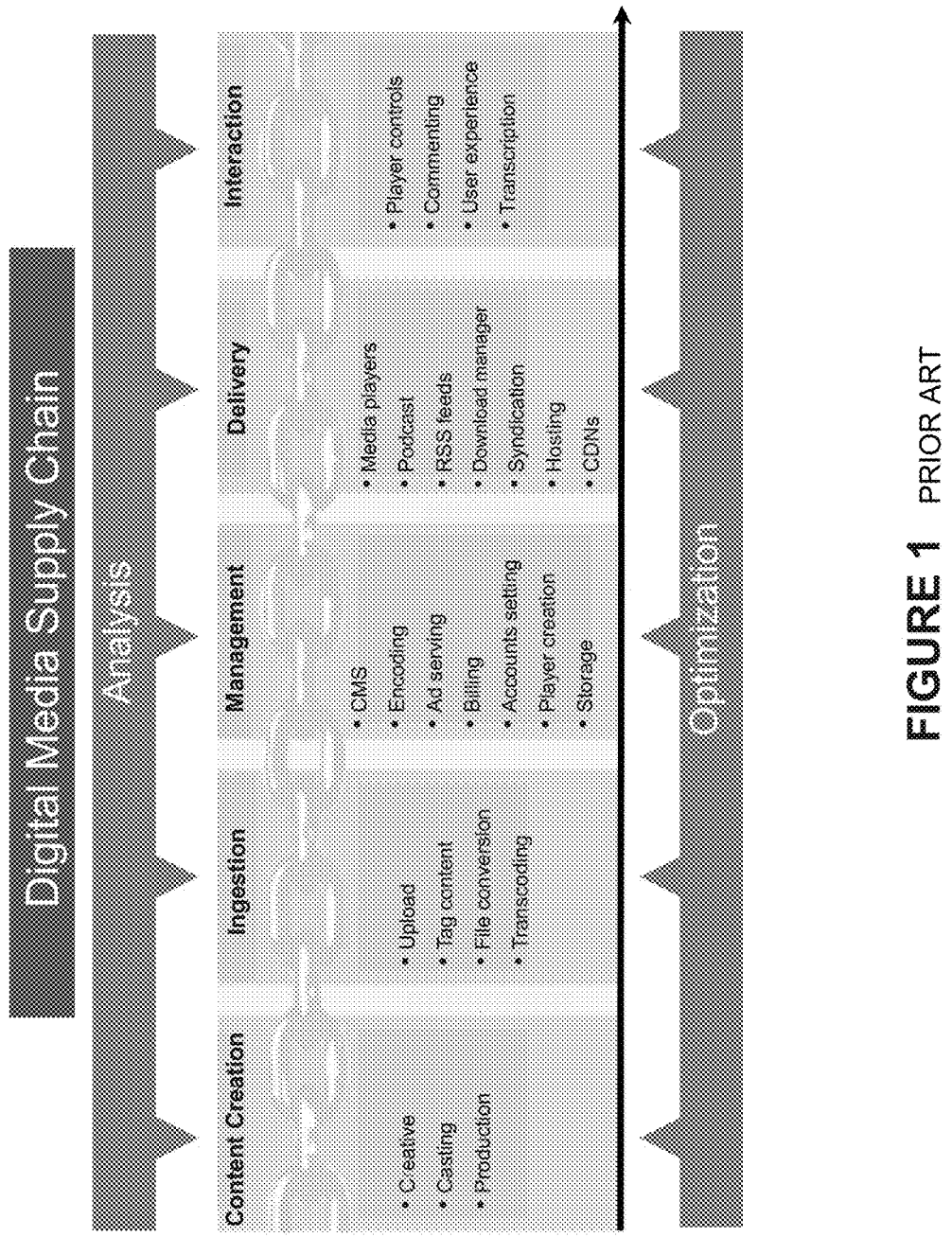
FIG. 1 illustrates a typical digital media supply chain.
Figure 2:
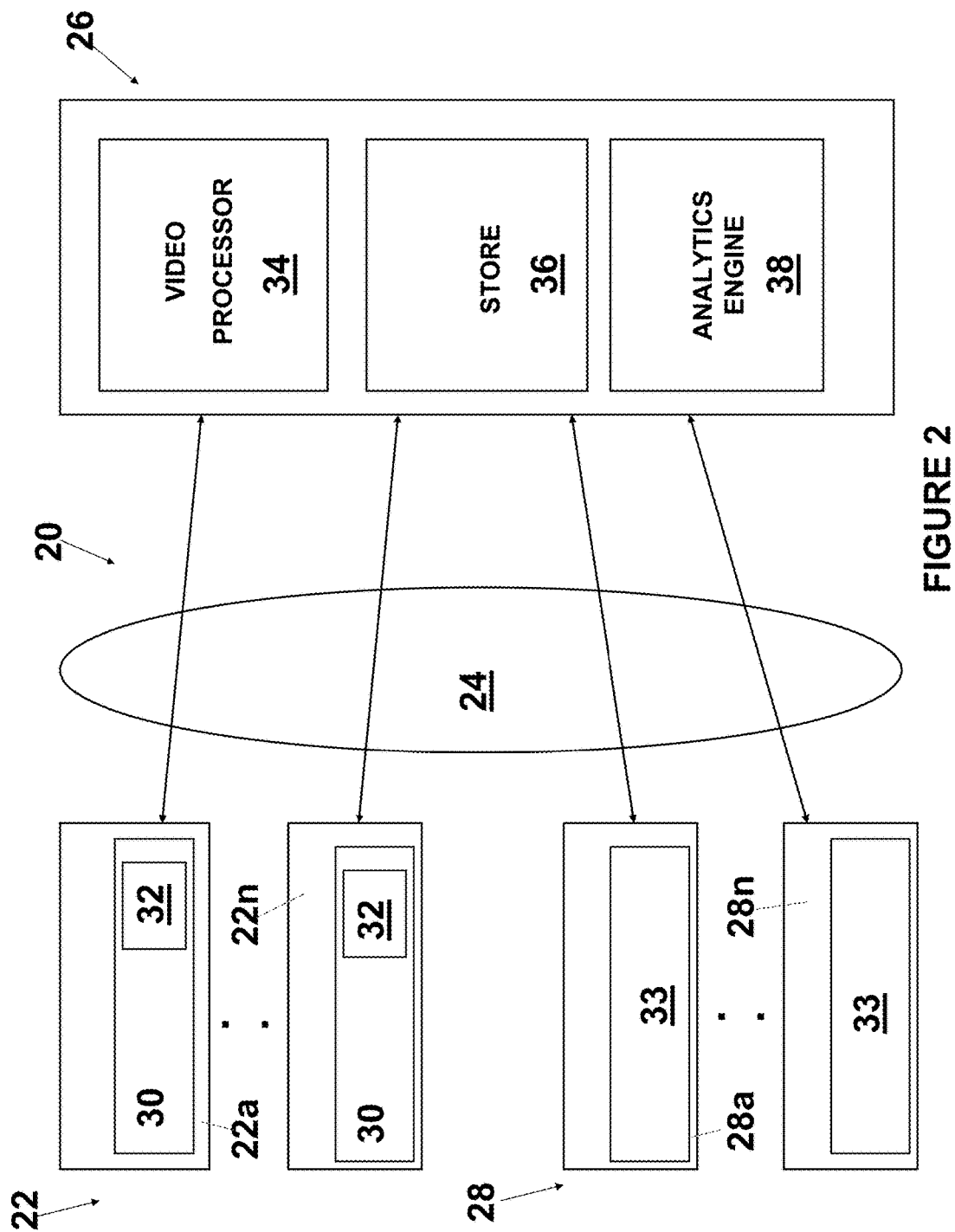
FIG. 2 illustrates an example of a web implementation of a video analytics for traffic, quality of service and engagement.

FIG. 2 illustrates an example of a web implementation of a video analytics for traffic, quality of service and engagement system 20. The system provides business intelligence on the broad areas of traffic statistics, viewer engagement, and quality of service for online video publishers wherein an "online video publisher" means any company that puts videos on its web site or syndicates video content to other web sites. The traffic statistics may simply involve measuring how many people watch which videos, from where, and at what times. Viewer engagement, on the other hand, measures viewership and interaction patterns within a video view—how much of the video do viewers watch, do they use pause/rewind/fast forward, etc. The quality of service refers to the measurement of quality of the viewer experience on technical dimensions. For example, how long does the video take to start after the play button is hit? What other delays do viewers experience? Does the video stall? And, what resolution level is the audio and video delivered at? The effective resolution is a function of the bitrate (how fast is data delivered to the viewer) and the framerate (how often does the video image change). A fast framerate and a slow bitrate mean poor picture resolution. On the other hand, a slow framerate and a fast bitrate allow extremely high picture resolution. The perceived quality of the experience is a function of both the framerate and the picture resolution. To maximize both of these demands a comparatively high bitrate.

Returning to FIG. 2, the system 20 may comprise one or more computing devices 22 (such as computing devices 22*a*, . . . , 22*n*) that are used to download and/or view/display/play videos which are coupled over a link 24 to a video analytics unit 26. The system may also have one or more computing devices 28 (such as computing devices 28*a*, . . . , 28*n*) that are used by customers of the video analytics system to view the output of the video analytics system as described below in more detail. Each computing device 22 or 28 may be a processing unit based device (with one or more processors), with memory (SRAM. DRAM, flash, hard drive, etc.) and connectivity (wired or wireless circuits and ports) to be able to interact with the video analytics system and perform the operations and functions as described below. Each computing device 22 or 28 uses typical protocols and communication techniques to interact with the video analytics unit 26 that in turn has the typical modules so that the video analytics unit 26 can interact with the computing devices. For example, each computing device 22 or 28 may be a personal computer, a tablet computer, a laptop computer, a netbook computer, a mobile phone device, a smartphone device (Apple iPhone, Palm devices, RIM devices or Android based devices), a set-top box, a gaming console, digital signage and the like. The link 24 may be a wired or wireless link and may be, in one embodiment, the Internet. The video analytics unit 26 may be one or more computing units (one or more server computers for example). In one implementation, the one or more computing units execute a plurality of lines of computer code to implement the functions and operations of the video analytics unit as described below. The video analytics unit 26 may also be implemented in hardware and thus have one or more different hardware units/modules that implement the functions and operations of the video analytics unit as described below.

In one implementation, each computing device 22 that is used to download and/or view/display/play videos further may include an operating system (Windows, Linux, Apple, etc.), a typical browser application (not shown) such as Internet Explorer, Firefox, Safari, etc.), a media player 30 (Windows Media Player, Quicktime and the like) and a tracker unit 32. Alternatively, each computing device 22 may use a browser application to download newer versions of HTML code that allow the browser to play video without a media player. The browser application allows the user to browse the Internet and download videos. The media player (if required) allows the user to view/display/play videos. The tracker unit gathers information about the traffic statistics, viewer engagement, and quality of service of the video (the "video information") being viewed by the user (as described in more detail below) and sends the video information to the video analytics unit 26 over the link 24 as described in more detail below. In one implementation, the browser, media player and tracker are each a plurality of lines of computer code that are executed by the one or more processing units of the computing device.

In more detail, the video that is viewed/displayed/played by the computing device 22 may be a file containing content in an encoded video format. This format allows it to be translated into audio and video by "core" video player 30 software such as Flash, Windows Media Player, QuickTime, RealPlayer, etc. When a viewer clicks on a video on a web site, however, he/she does not simply download the video content file. Rather, he/she is typically directed into a "player" application embedded on the web site. When this happens, the player application is sent from the web server of the website to the computing device 22 where it runs, calling the core player 30 software as a subroutine. From the computing device 22, the player application will connect to a streaming server (typically part of a content distribution network, or CDN) and retrieve the video content file from there, translating it from bits/bytes into video and/or audio as it is received.

In one implementation, the tracker unit 32 is a piece of code (an example of which is attached as Appendix A which is incorporated herein by reference) which will be incorporated in the player application and will be called as a subroutine therein. The tracker unit may also be downloaded to the computing unit when a video is to be played. As the process of retrieving and playing a video progresses, the tracker unit will track/"listen" to events from tracking streams within the core player software and embed the relevant data using various communication methods or protocols, such as http calls for example, that are issued over the internet to the attention of video analytics system 26.

The tracker unit captures various video information and then is able to measure a vast number of valuable quality of service and engagement metrics for the video. The video information that may be captured by the video analytics system may include various metrics that are averages across a plurality of video plays. The information captured by each tracker unit, at any moment, are various video information about a single video play and the analytics system then combines each set of video information about a single video play and averages the sets to generate the metrics that may include (but are not limited to):

Average Bitrate (kilobits per second)—An average across the number of video plays ("Plays") of the time-averaged bitrate.

Average Buffer Initialization Time (ms)—An average across Plays of the Buffer Initialization Time which is the time it takes for the client to load the initial data buffer and begin streaming. The time taken for a video to start once the play button is hit consists of the fetch time (time to connect to the video streaming and begin filling the buffer) and the buffer initialization time (time to finish filling the buffer to the point at which playback will begin).

Average Buffer Size (ms)—The average amount of content buffered ahead of the playout position (in seconds). How much time the user can continue to watch if the streaming data delivery stalls. If the delivery kicks back in before the user exhausts this buffer, the user will not notice a stall so that the more there is in the buffer, the less likely that the user will perceive a stall.

Average Downshifts/Upshifts per Play—Cutting-edge video delivery involves adaptive bitrate strategies (known variously as adaptive streaming, dynamic streaming, or smooth streaming). These strategies switch a viewer between bitrates if the quality of the viewer's connection changes. For example, if somebody else sharing the same DSL line starts watching a video and the effective bandwidth drops, the user's bitrate will be lowered so that the user does not experience buffering and stall behavior. The system may measure both upshifts (shifting from a lower bitrate to a higher bitrate) and downshifts (shifting from a higher bitrate to a lower bitrate.)

Average Framerate—An average number of frames per second of the video during the play.

Average Measured Bandwidth (kbps)—Note that this is effectively the width of the "pipe" to the users, while the bitrate above represents how much of this capacity is actually utilized.

Average Rebuffers per Play—The total number of rebuffering event when a video stall occurs within the filter set/time range divided by the total number of Plays in the filter set/time range.

Average Rebuffer Time (ms)—The average time across rebuffering events that it takes for the computing device 22 to load the data buffer and resume streaming after a stall.

Average Seek Time (ms)—How long does it take the player to advance to the proper location and begin playing again after the viewer attempts a rewind or fast forward.

Average Server Fetch/Initialization Time (ms)—Average across plays of the Server Fetch/Initialization Time. Time it takes for the server to fetch the streaming file and begin serving data.

Average Pauses/Stops per Play—the number of times that the user hits the Pause or Stop button while playing a video over a large number of videos. This is an engagement measure.

Average Total Wait Time per Play (ms)—The average amount of time spent waiting for startup, rebuffering (due to stalls and seeks), and rewind/fast forward seeks during the typical Play. The average across all Plays in the time range/filter set of Wait Time.

Average Wait Time Percentage—The Total Wait Time divided by a total amount of time during which the user views videos ("Total Play Time".)

Downshift Count—the count of Downshift events in a time range and filter set.

Downshifts per Play —The Downshift Count divided by a number of plays by the user ("Total Plays".) This is a real number with one place past the decimal point.

Rebuffer Count—the total number of Rebuffering events a time range/filter set.

Screen Resolution —The resolution capability of the user's monitor hardware. Not the same as Video Resolution, which is the encoded resolution being transmitted.

Total Rebuffer Count—Count of all Rebuffer (Stall) events across all Plays in the filter set/time range.

Total Wait Time (ms)—The sum of Wait Time across all Plays in a time range/filter set. Same as the sum of the time lengths of all waiting intervals during the time range/filter set.

Upshift Count—the count of Upshift events in a time range and filter set.

Upshifts per Play—Upshift Count divided by Total Plays.

Upshift/Downshift Count—the count of all bandwidth changes (upshifts and downshifts).

Upshifts/Downshifts per Play—Upshift/Downshift Count divided by Total Plays

Video Resolution—The size of the video image being transmitted, in pixels, with a horizontal and vertical component, e.g. 1024×468.

Wait Time—For a Play, the sum of the time lengths of all waiting intervals/segments within the Play.

Wait Time Percentage—For a video Play, the ratio of Wait Time (across all events within the play), divided by the Play Time. Note that, at least in theory, this can exceed 100%.

Stalls/Minute—A number of stalls of the video per minute

Dropped Frames rate—A number of frames dropped during the streaming of the video to the user Play Error Count—A number of play errors during a playing of a video of the user Returning to FIG. 2, in one implementation, each computing device 28 that is used by customers of the video analytics system to view the output of the video analytics system may include an operating system (Windows, Linux, Apple, etc.) and a typical browser application 33 such as Internet Explorer, Firefox, Safari, etc. The browser application allows the customer to connect to the video analytics system 26 and receive reports/data from the video analytics system about the aggregated or unaggregated video information as described below in more detail.

The video analytics unit 26 may further comprise a video processor unit 34, a store 36 and an analytics engine 38. The video processor unit 34 may receive the incoming video information from a plurality of tracker units 32 of the computing devices 22 and process the incoming video information into a format that can be stored in the store 36. The store 36 may store the processed video information, video analytics information derived from the processed video information, customer information, data to generate web pages with the video analytics information for the customers, etc. The analytics engine 38 performs various video processes and methods to generate the video analytics information and the displays of the video analytics information as described below in more detail. In one implementation, the video processor unit 34, the store 36 and the analytics engine 38 are each a plurality of lines of computer code that are executed by the one or more processing units of the video analytics unit 26. However, the video processor unit 34, the store 36 and the analytics engine 38 may also be implemented in hardware in some embodiments.

Figure 3:
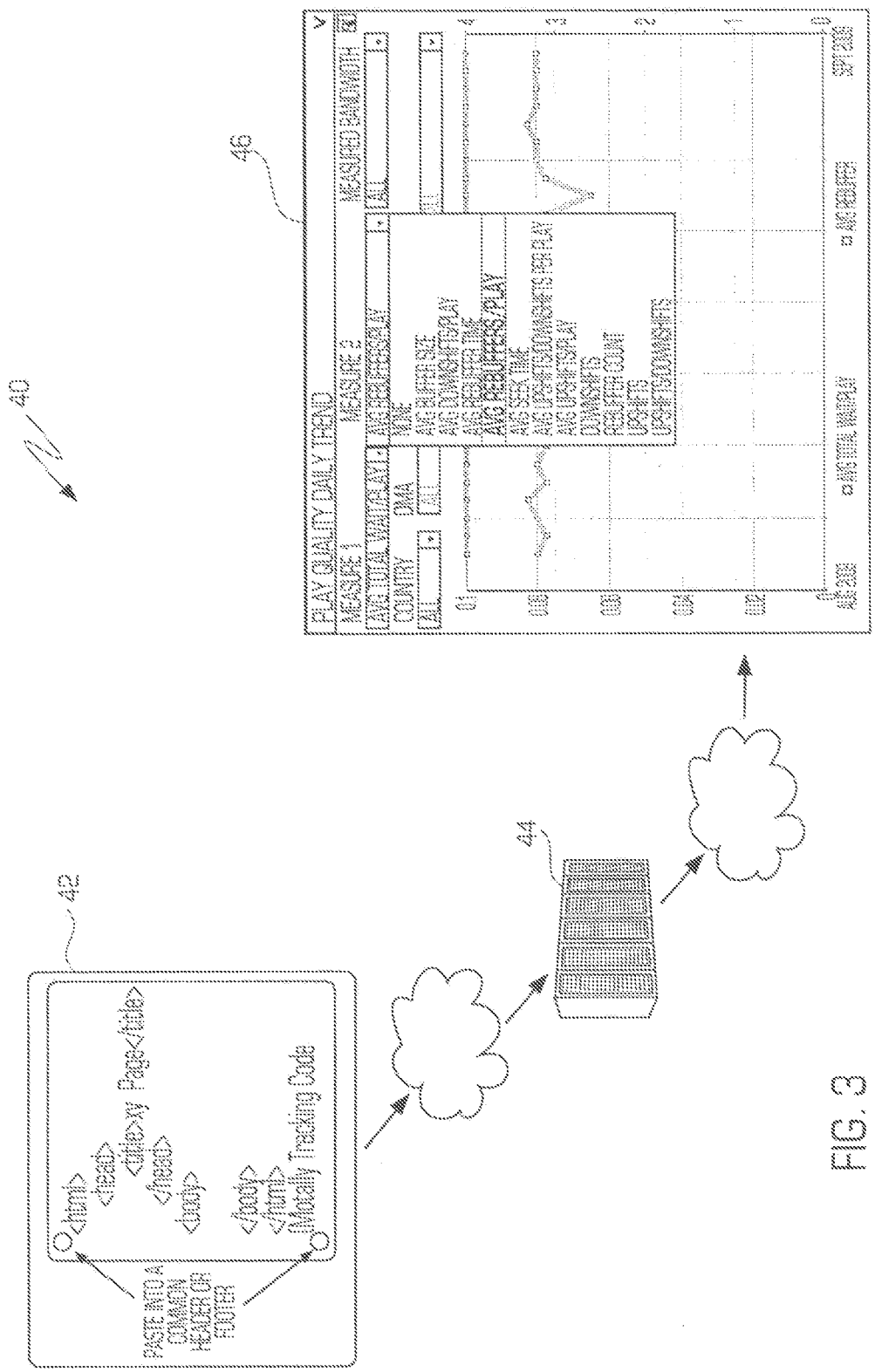
FIG. 3 illustrates a workflow of the video analytics for traffic, quality of service and engagement system.

FIG. 3 illustrates a workflow 40 of the video analytics for traffic, quality of service and engagement system. On the computing device 22 side, the tracker unit is installed into the media player at some time and the tracker unit tracks streams with the player an send the video information back to the video analytics unit 26 (42). At the video analytics unit 26, the video information is processed and converted into analytical information and stored in the store (44). In particular, the video processor unit 34 collects the raw video information data from the tracker units 32, processes it and turns it into analytical information. When the data is received, it is first "sessionized" (event messages are grouped by video play and placed in order within each play). The sessionized data is then processed so as to determine the values of various metrics for each play and their averages across plays.

In more detail, for "rate" type information (e.g., bandwidth, bitrate, framerate, etc.) readings are taken at various points in a play by the tracker unit either driven by events such as a stall, user action or triggered at constant or variable time intervals. At processing time, after sessionizing the data, the analytics engine 38 computes time-averages for each Play (based on the values and times at each observation point by each tracker unit) and then averages these across plays to derive the analytic. The time averages are computed by, for each event, taking the value vn and the time tn; adding $v_n*(t_n-t_{n-1})$ to a running total of weighted values; adding $(t_n-t_{n-1})$ to a running total of weights—and then dividing the final total of weighted values by the final total of weights.

In more detail, for shift, stall, or other counts, the events are simply added up through each Play and across Plays. They are then divided by total play counts or time amounts as needed to get the required metrics. In addition, wait times are computed by capturing the elapsed times between events that indicate the start of waiting (clicking the play button, a stall, or the initiation of a fast forward or rewind "seek") and the subsequent play-start events.

Figure 4:
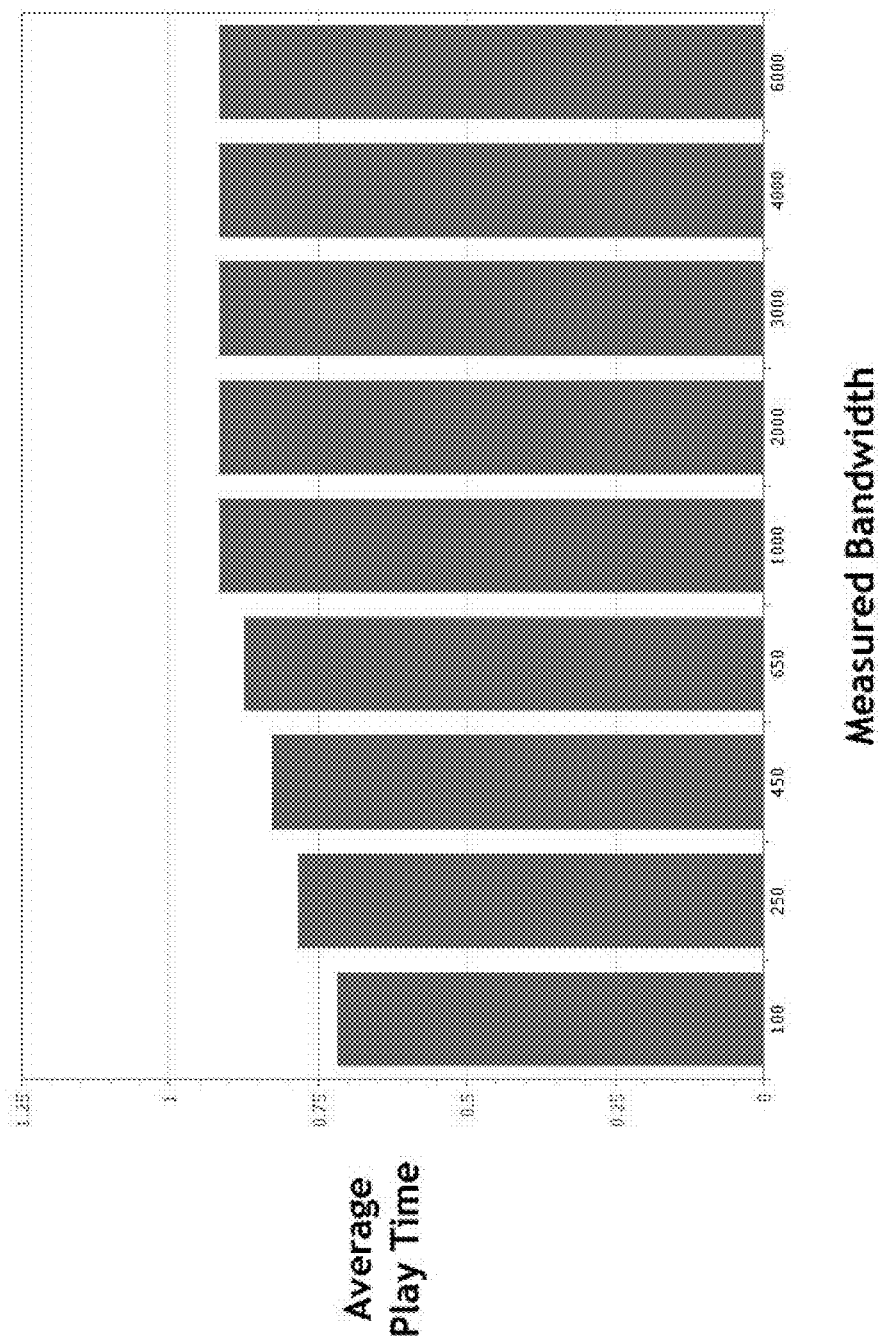
FIG. 4 illustrates an example of a graph generated by the traffic, quality of service and engagement system that shows viewer engagement statistics as a function of quality metrics.
Figure 5A:
FIG. 5A-5E illustrate examples of the dashboards that may be generated by the traffic, quality of service and engagement system.
Figure 5B:
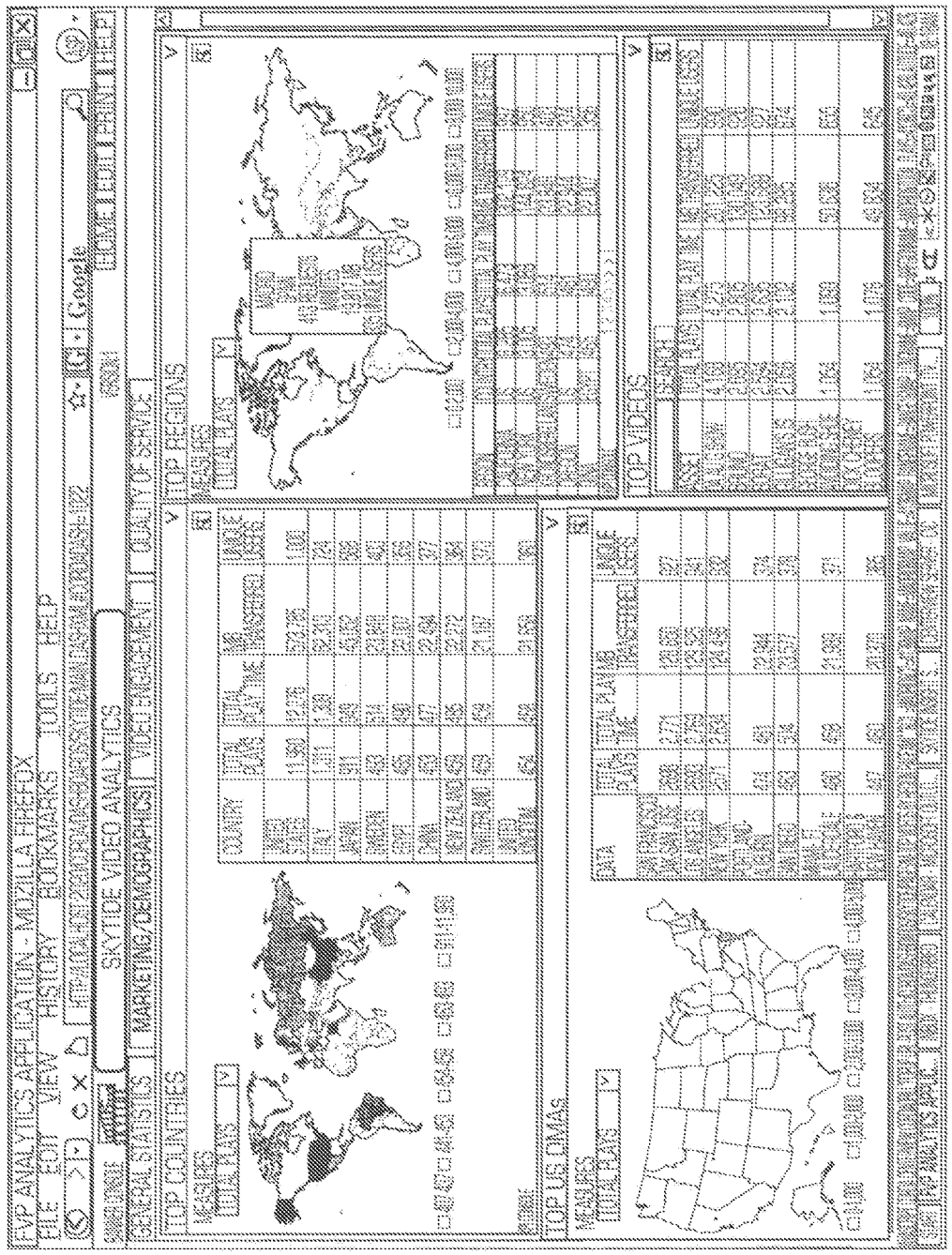
Figure 5C:
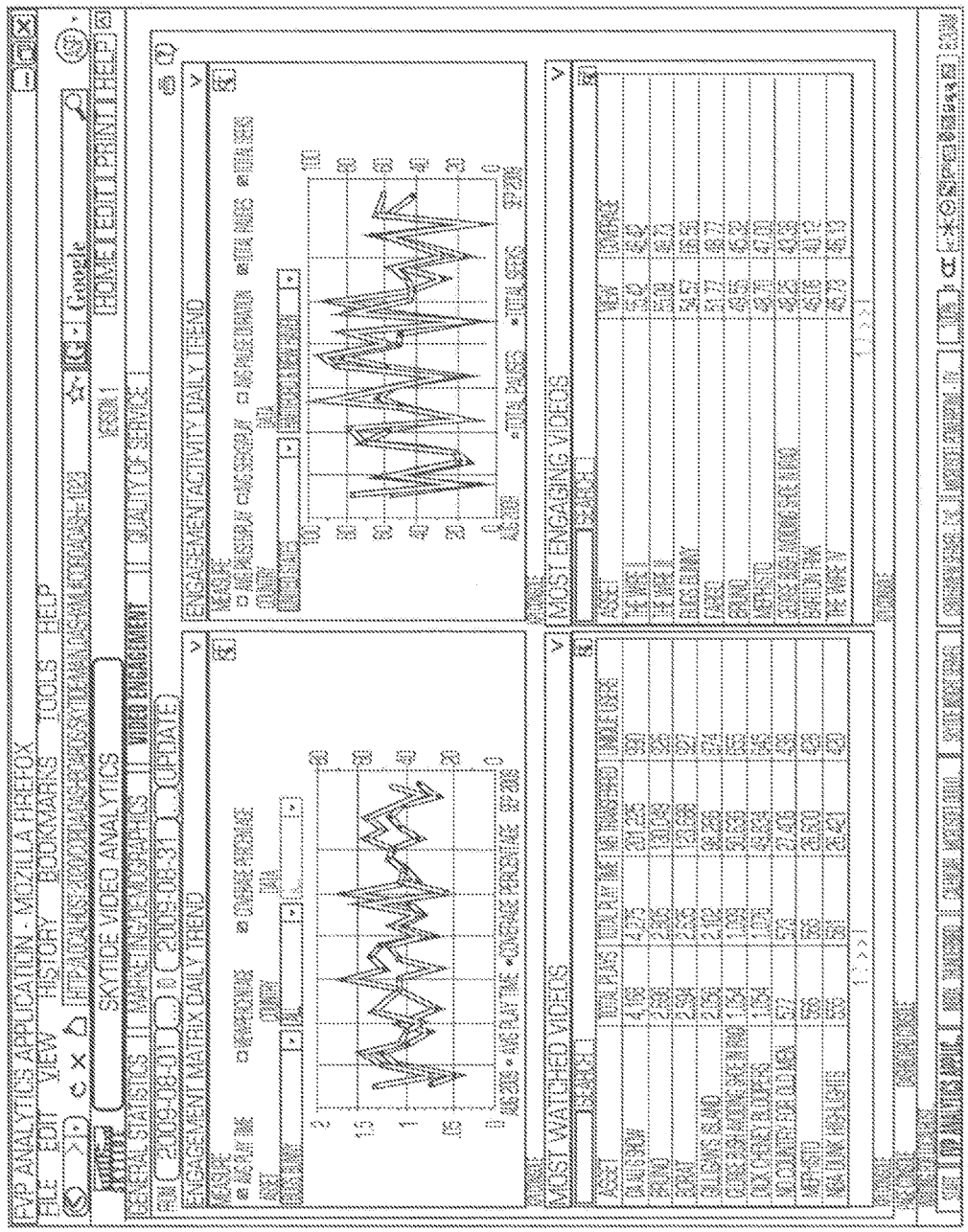
Figure 5D:
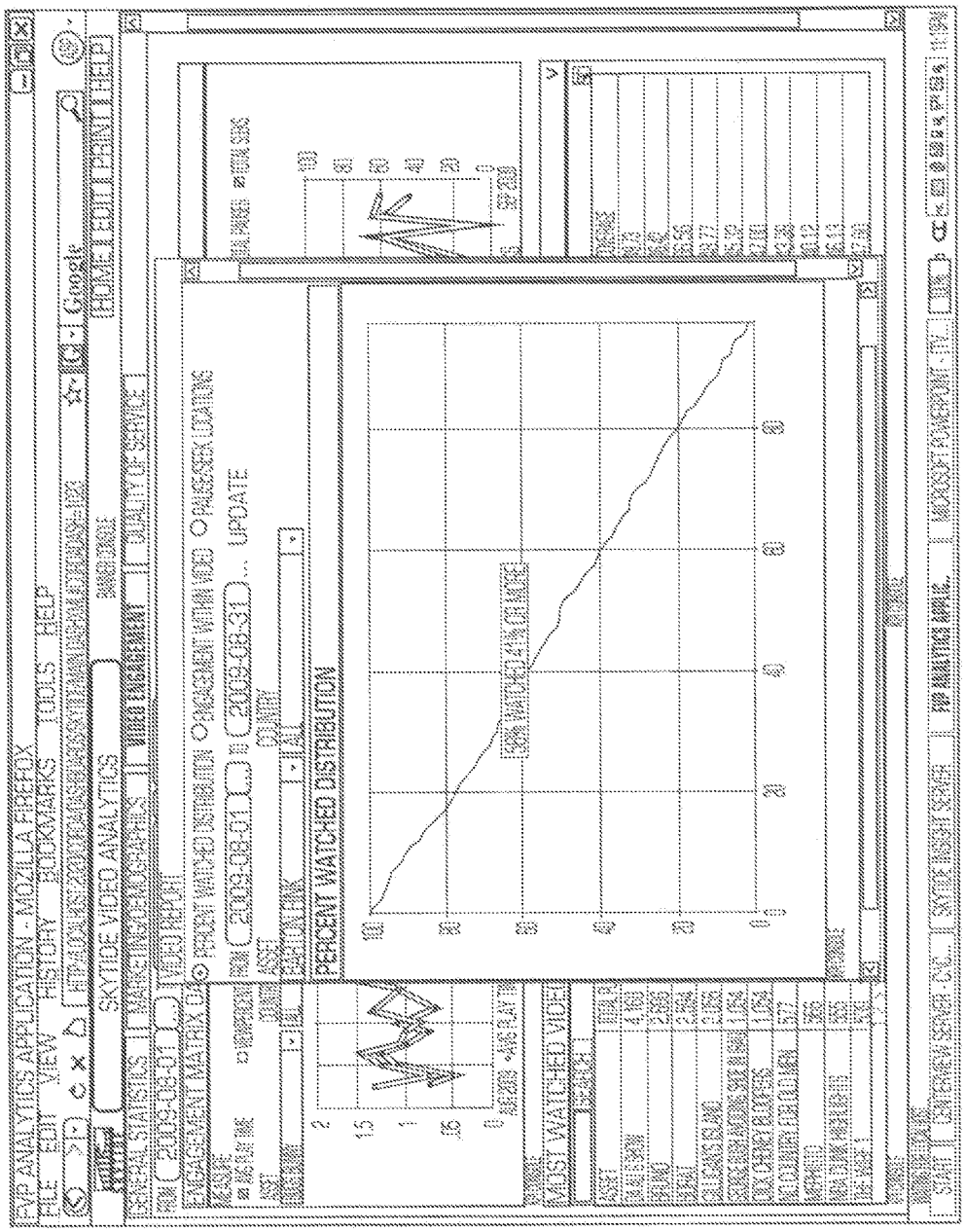
Figure 5E:
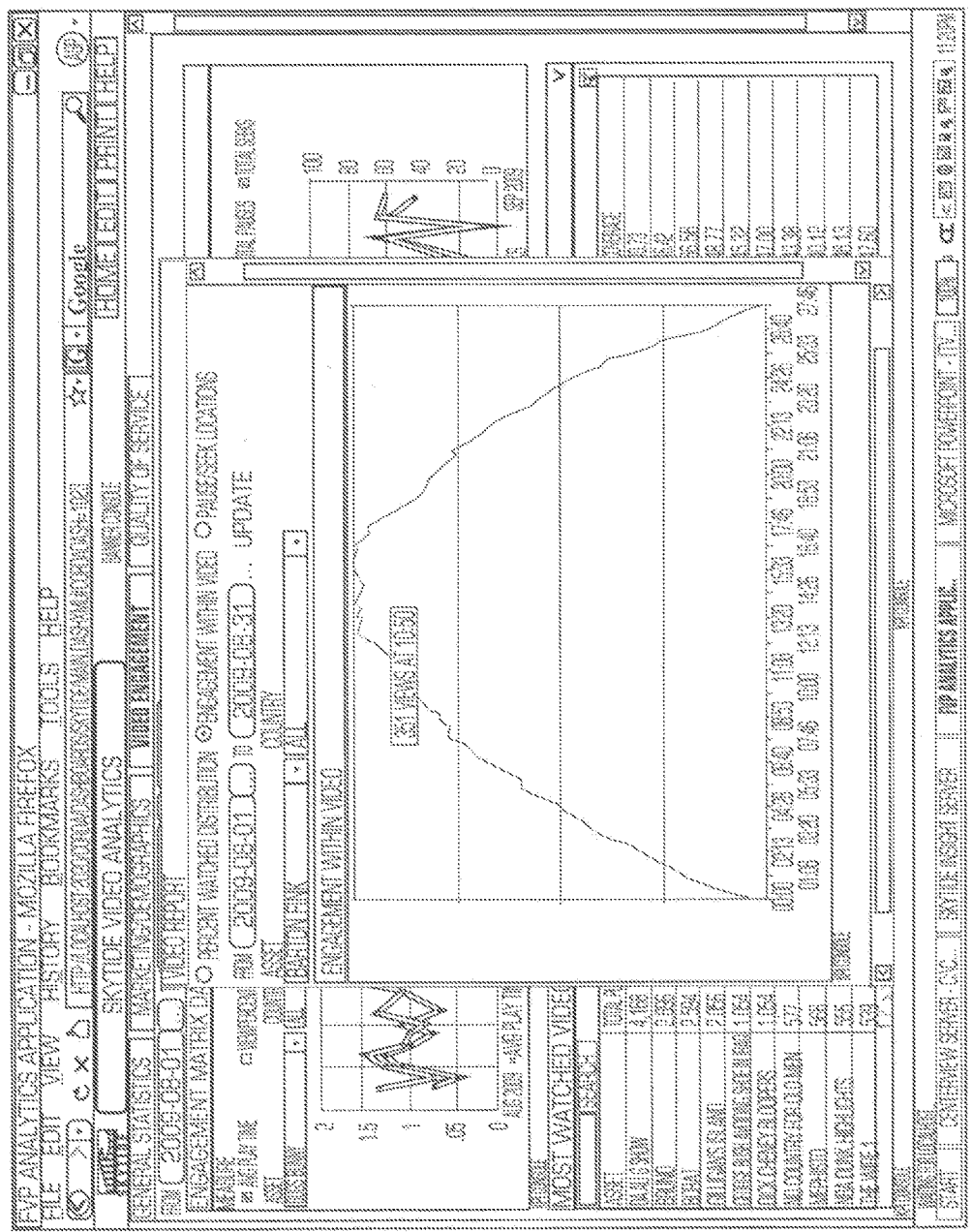

Once the techniques described above have been used to get the by-play metric values, those values can be summed or averaged across plays as necessary to produce the global values. To enable actionable insights, the above metrics can be stratified by the following dimensions:
* time (to a predetermined level) wherein the predetermined level can be hourly or by the minute
* geography (to a predetermined level) wherein the predetermined level can be to city level or to the 9-digit ZIP+4 code level
* content delivery network used to deliver the video
* internet service provider used to deliver the video
* measured bandwidth or bitrate level
* delivery method or protocol (e.g., streaming or progressive download)
* live vs. on-demand video
* web site The analytics engine 38 provides the ability to graph viewer engagement statistics as a function of quality metrics that shows a correlation of the two statistics/metrics. An example of the graph generated by the system is shown in FIG. 4 which shows the average play time for a video (an viewer engagement statistic) as a function of measured bandwidth (a quality of service metric). In the example in FIG. 4, the viewer engagement increases as the quality of service improves to some level at which the viewer engagement is not affected by increased bandwidth which may indicate that bandwidth beyond a certain level is unnecessary to maximize viewer engagement. This enables users to quantify the extent to which improved quality (higher resolution, less delays) translates to longer viewing times (and, by extension, more advertising and/or other revenue). This allows a manager to evaluate any technology or content delivery initiative with a realistic evaluation of how much this cost item will actually add to revenue-related measures.

Thus, the system may measure both engagement and quality of service of a video at a granular level (at the individual video play level) which is useful and important. In particular, if a competitor measured the two metrics separately, with different tools/systems, the user of the competitor system can say "last month our quality was up and engagement was up, the month before they were both down, therefore we think they're correlated" which is not very precise or convincing. However, by measuring them together at the play level as is done with the system described above, the system can generate a "scatter plot" of every observation and correlate the measures precisely, as well as slicing dimensionally to see how the correlation varies by time, geography, site, type of content, etc. The measurement of both engagement and quality thus allows much better understanding of the correlation which is hugely valuable in determining the sensitivity of the audience to quality changes and the return on investment of investments to improve quality.

Returning to FIG. 3, once the analytical information is generated by the system, the customers can access reports stored on the video analytics unit 26 over the link 24. In particular, the customers can access on-line interactive dashboards (46). Examples of the dashboards that can be generated by the system for a customer are shown in FIG. 5A-5E.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A video analytics system, comprising:
one or more tracker units configured to gather one or more sets of video information associated with a playing of one or more videos, wherein each tracker unit is configured to operate on a corresponding computing device configured to play one or more videos from which a set of video information is gathered and wherein the one or more sets of gathered video information includes tracking event information having data representing events that occur during the playing of the one or more videos; and
a video analytics unit, coupled to each computing device over a link, configured to receive the set of video information from each tracker unit, to generate one or more quality of service metrics based on the one or more sets of video information from the one or more tracker units, and to generate one or more viewer engagement metrics based on at least the tracking event information from the one or more tracker units, wherein the one or more viewer engagement metrics are metrics showing how a viewer interacted with the one or more videos played on the corresponding computing device;
said video analytics unit is further configured to generate a display of a correlation of a selected quality of service metric and a selected viewer engagement metric.

2. The system of claim 1, wherein the viewer engagement metrics includes one or more of an average play time of the one or more videos, and an average number of pauses or stops per each play of each video.

3. The system of claim 1, wherein the one or more quality of service metrics further comprises one or more of an average bitrate, an average buffer in itialization time, an average buffer size, an average number of downshifts per each play of each video, an average number of upshifts per each play of each video, an average frameset, an average measured bandwidth, an average number of rebuffers per each play of each video, an average rebuffer time, an average seek time, an average server fetch time, an average total wait time per each play of each video, an average wait time percentage, a downshift count per each play of each video, a rebuffer count, a screen resolution, a total rebuffer count, a total wait time, an upshift count, a count of upshifts per each play of each video, a video resolution, a wait time, a wait time percentage, a stall per minute value, a dropped frames rate value, and an error count per each play of each video.

4. The system of claim 1, wherein the video analytics unit is configured to filter the one or more quality of service metrics using one or more dimensions to generate a filtered quality of service metrics.

5. The system of claim 4, wherein the one or more dimensions further comprises one of time, geography, content delivery network used for the videos, internet service provider used for the videos, measured bandwidth of the videos, delivery protocol for the videos, live or on-demand videos and a particular website hosting the video.

6. A video analytics method, comprising:
receiving, at a video analytics unit coupled to one or more computing devices over a link, a set of video information from each tracker unit that is installed on each computing device of the one or more computing devices, wherein each tracker unit tracks the set of video information associated with a playing of one or more videos on the corresponding computing device and wherein the one or more sets of gathered video information includes tracking event information having data representing events that occur during the playing of the one or more videos;

generating, at the video analytics unit, one or more quality of service metrics based on the one or more sets of video information from the one or more tracker units;

generating, at the video analytics unit, one or more viewer engagement metrics based on at least the tracking event information from the one or more tracker units, wherein the one or more viewer engagement metrics are metrics showing how a viewer interacted with the one or more videos played on the corresponding computing devices; and generating, at the video analytics unit, a display of a correlation of a selected quality of service metric and a selected viewer engagement metric.

7. The method of claim 6, wherein the viewer engagement metrics includes one or more of an average play time of the one or more videos, and an average number of pauses or stops per each play of each video.

8. The method of claim 6, wherein the one or more quality of service metrics further comprises one or more of an average bitrate, an average buffer initialization time, an average buffer size, an average number of downshifts per each play of each video, an average number of upshifts per each play of each video, an average frameset, an average measured bandwidth, an average number of rebuffers per each play of each video, an average rebuffer time, an average seek time, an average server fetch time, an average total wait time per each play of each video, an average wait time percentage, a downshift count per each play of each video, a rebuffer count, a screen resolution, a total rebuffer count, a total wait time, an upshift count, a count of upshifts per each play of each video, a video resolution, a wait time, a wait time percentage, a stall per minute value, a dropped frames rate value and an error count per each play of each video.

9. The method of claim 6 further comprising filtering the one or more quality of service metrics using one or more dimensions to generate a filtered quality of service metrics.

10. The method of claim 9, wherein the one or more dimensions further comprises one of time, geography, content delivery network used for the videos, internet service provider used for the videos, measured bandwidth of the videos, delivery protocol for the videos, live or on-demand videos and a particular website hosting the video.

11. A video analytics system, comprising:

one or more tracker units configured to gather one or more sets of video information associated with a playing of one or more videos, wherein each tracker unit is configured to operate on a corresponding computing device configured to play one or more videos from which a set of video information is gathered and wherein the one or more sets of gathered video information includes tracking event information having data representing events that occur during the playing of the one or more videos; and a video analytics unit, coupled to each computing device over a link, configured to receive the set of video information from each tracker unit, to generate one or more quality of service metrics based on the one or more sets of video information from the one or more tracker units, to generate one or more viewer engagement metrics based on at least the tracking event information from the one or more tracker units, and to generate a display of a correlation of a selected quality of service metric and a selected viewer engagement metric, wherein the one or more viewer engagement metrics are metrics showing how a viewer interacted with the one or more videos played on the corresponding computing device.

\* \* \* \* \*